US010114685B2

(12) United States Patent
Sonnekalb et al.

(10) Patent No.: US 10,114,685 B2
(45) Date of Patent: Oct. 30, 2018

(54) SYSTEM AND METHOD FOR ERROR DETECTION OF EXECUTED PROGRAM CODE EMPLOYING COMPRESSED INSTRUCTION SIGNATURES

(71) Applicant: Infineon Technologies AG, Neubiberg (DE)

(72) Inventors: Steffen Sonnekalb, Munich (DE); Andreas Wenzel, Munich (DE)

(73) Assignee: Infineon Technologies AG, Neubiberg (DE)

( * ) Notice: Subject to any disclaimer, the term of this patent is extended or adjusted under 35 U.S.C. 154(b) by 133 days.

(21) Appl. No.: 15/014,251

(22) Filed: Feb. 3, 2016

(65) Prior Publication Data

US 2016/0232050 A1    Aug. 11, 2016

(30) Foreign Application Priority Data

Feb. 5, 2015    (DE) .................. 10 2015 202 049

(51) Int. Cl.
*G06F 11/07* (2006.01)
*G06F 9/30* (2018.01)
(Continued)

(52) U.S. Cl.
CPC ...... *G06F 11/0721* (2013.01); *G06F 9/30145* (2013.01); *G06F 11/0706* (2013.01);
(Continued)

(58) Field of Classification Search
CPC .. G06F 11/0721; G06F 11/0706; G06F 11/08; G06F 11/0875
(Continued)

(56) References Cited

U.S. PATENT DOCUMENTS 5,829,031 A * 10/1998 Lynch .................. G06F 9/3017
711/137
5,974,529 A * 10/1999 Zumkehr .............. G06F 9/3005
712/239

(Continued)

FOREIGN PATENT DOCUMENTS

DE        102005050767 A1    4/2007

*Primary Examiner* — Kamini B Patel
(74) *Attorney, Agent, or Firm* — Schiff Hardin LLP

(57) ABSTRACT

A system comprising a first processor and a second processor is provided. The first processor is configured to load an instruction block from a first memory, wherein said instruction block comprises a plurality of opcodes and a stored error code. For each opcode of the plurality of opcodes of the instruction block, the first processor is configured to determine a first determined signature depending on said opcode. The first processor is configured to determine a determined error code for the instruction block depending on each opcode and depending on the first determined signature of each opcode of the plurality of opcodes of the instruction block. Moreover, the first processor is configured to determine that a first error occurred, if the determined error code is different from the stored error code. The second processor is configured to determine a second determined signature for a current opcode of the plurality of opcodes of the instruction block depending on said current opcode. Moreover, the second processor is configured to determine that a second error occurred, if the second determined signature for the current opcode is different from the first determined signature for the current opcode.

17 Claims, 9 Drawing Sheets

(51) Int. Cl.
    *G06F 12/0875*    (2016.01)
    *G06F 11/08*    (2006.01)

(52) U.S. Cl.
    CPC .......... *G06F 11/08* (2013.01); *G06F 12/0875* (2013.01); *G06F 2212/452* (2013.01)

(58) Field of Classification Search
    USPC .......................................................... 714/49
    See application file for complete search history.

(56) References Cited

U.S. PATENT DOCUMENTS

| | | | | |
|---|---|---|---|---|
| 6,357,024 | B1* | 3/2002 | Dutton | G06F 11/1641 |
| | | | | 714/45 |
| 6,954,886 | B2* | 10/2005 | Tu | G06F 11/1658 |
| | | | | 714/726 |
| 7,194,671 | B2* | 3/2007 | Tu | G06F 11/1641 |
| | | | | 714/733 |
| 7,506,217 | B2* | 3/2009 | Borin | G06F 11/1004 |
| | | | | 714/51 |
| 2008/0220545 | A1* | 9/2008 | Pelley | G01R 31/318513 |
| | | | | 438/14 |
| 2010/0241905 | A1* | 9/2010 | Avritzer | G06F 11/1438 |
| | | | | 714/38.13 |
| 2014/0082724 | A1* | 3/2014 | Pearson | G06F 21/575 |
| | | | | 726/22 |
| 2015/0113637 | A1* | 4/2015 | Wenzel | G06F 21/52 |
| | | | | 726/22 |

* cited by examiner

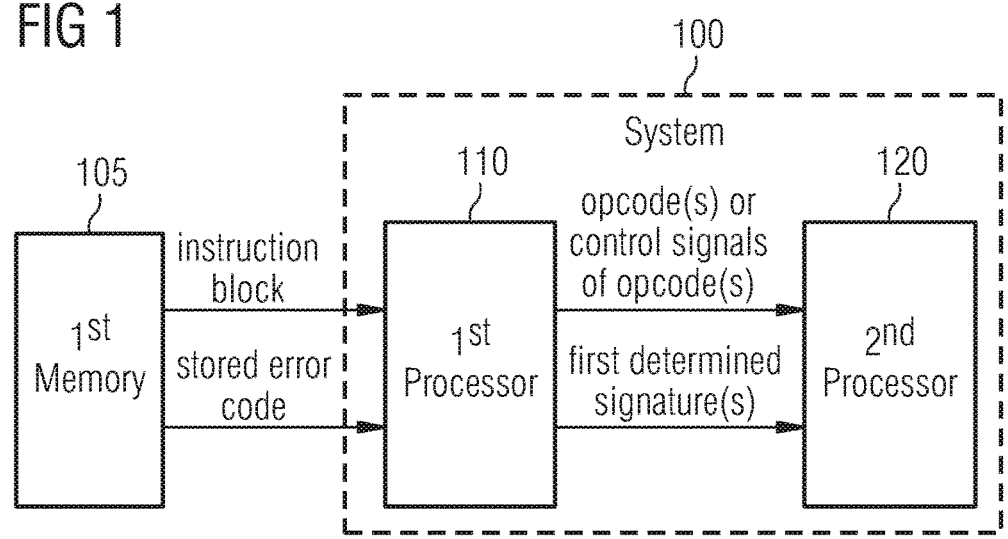
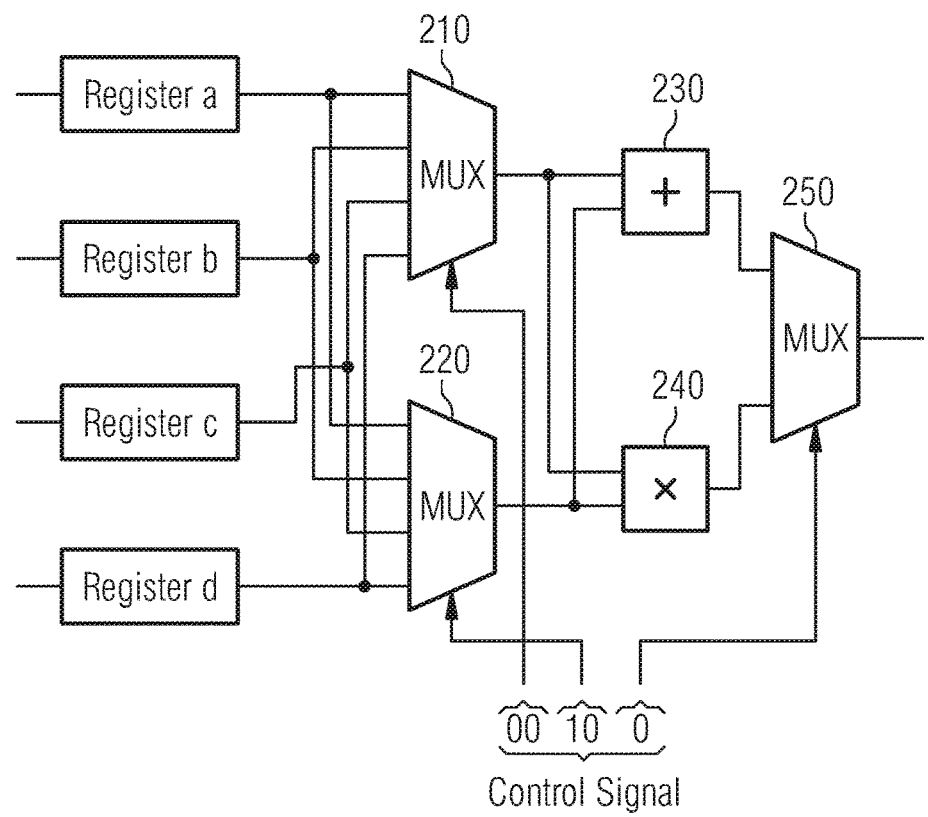

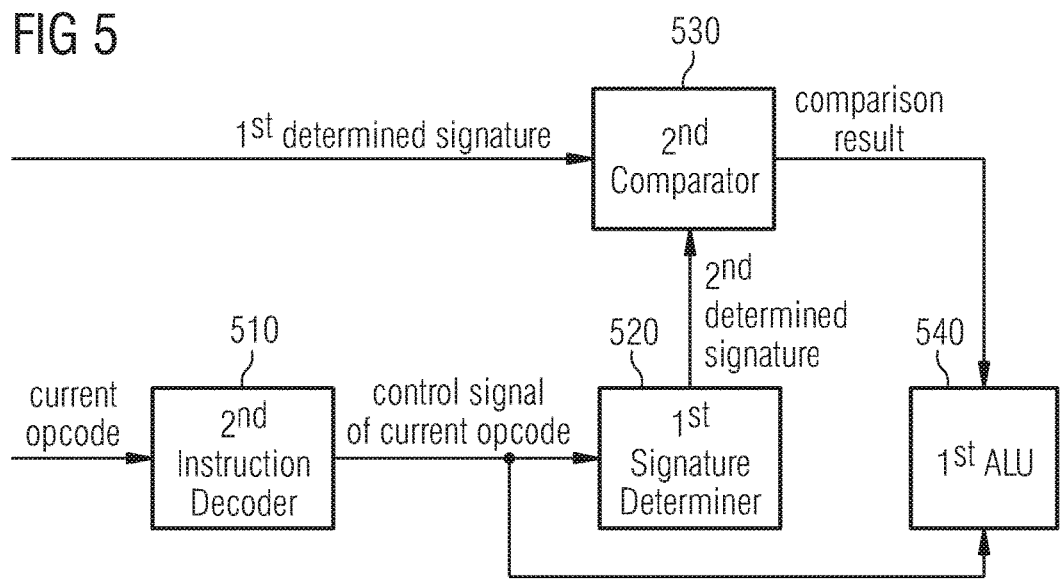
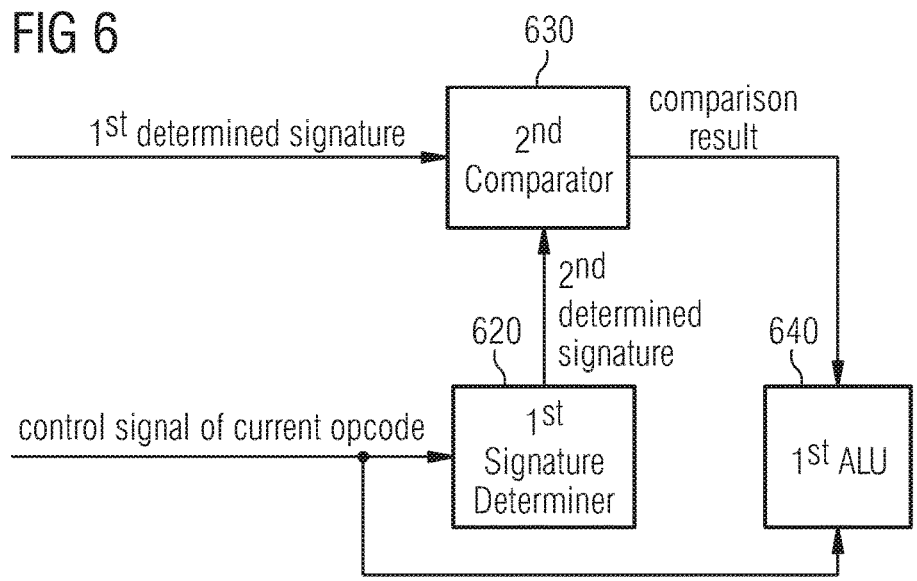

| word0 | word1 | word2 | word3 | word4 | word5 | word6 | word7 | word EDC |
|---|---|---|---|---|---|---|---|---|
| Instr (PC0) | Instr (PC2) | Instr (PC3) | | Instr (PC5) (PC6) | Instr (PC7) | Instr (PC8) | Instr (PC9) (PC10) (PC11) | Instr (PC12) | use also Instr(PC12)

n=10

| Instr (PC0) | Instr (PC1) | Instr (PC2) | Instr (PC3) | Instr (PC4) | Instr (PC5) | Instr (PC6) (PC7) | Instr (PC8) | Instr (PC9) | Instr (PC10) |

Instr (PC-1)
Skip Instr(PC-1)

FIG 9C

| Instr (PC0) | Instr (PC1) | Instr (PC2) | Instr (PC3) | Instr (PC4) | Instr (PC5) | Instr (PC6) | Instr (PC7) | Instr (PC8) | Instr (PC9) | Instr (PC10) | Instr (PC11) | Instr (PC12) |
|---|---|---|---|---|---|---|---|---|---|---|---|---|
| Instr Code (PC0) | Instr Code (PC1) | - | Instr Code (PC3) | Instr Code (PC4) | Instr Code (PC5) | Instr Code (PC6) | Instr Code (PC7) | - | Instr Code (PC9) | Instr Code (PC10) | Instr Code (PC11) | Instr Code (PC12) |

| Instr (PC-1) | Instr (PC0) | Instr (PC1) | Instr (PC2) | Instr (PC3) | - | Instr (PC4) | Instr (PC5) | - | Instr (PC6) | Instr (PC7) | Instr (PC8) | Instr (PC9) | Instr (PC10) |
|---|---|---|---|---|---|---|---|---|---|---|---|---|---|
| - | Instr Code (PC0) | Instr Code (PC1) | Instr Code (PC2) | Instr Code (PC3) | Instr Code (PC4) | Instr Code (PC5) | - | Instr Code (PC6) | Instr Code (PC7) | Instr Code (PC8) | Instr Code (PC9) | - | Instr Code (PC10) |

SYSTEM AND METHOD FOR ERROR DETECTION OF EXECUTED PROGRAM CODE EMPLOYING COMPRESSED INSTRUCTION SIGNATURES

FIELD OF THE INVENTION

The present invention relates to a system and method for error detection, and, in particular, to a system and method for error detection of executed program code instructions using compressed instruction signatures.

BACKGROUND AND PRIOR ART

When executing an opcode sequence of a software program, errors may occur, which, if they remain undetected, can cause undesired malfunctions.

According to the prior art, along with error correction, error detection is conducted, to avoid undesired malfunctions. Error detection may be conducted by employing software-checks, by using hardware redundancy (multiple CPUs) and by employing error detecting codes. Regarding codes, one can distinguish between pure error detecting codes being part of a memory block or a signature being integrated into the opcode sequence.

These implementations have the disadvantage that they often exhibit a very high overhead regarding the hardware implementation or that they require lots of memory and/or have a considerable influence on the program that shall be protected. Moreover, error detection mechanism only work at the point where a signature solution exists, but no continuous error detection mechanism can be established. As the signature solutions being integrated into the code have to be adapted to the opcode sizes, no adaptively scalable protection is possible.

SUMMARY OF THE INVENTION

The object of the present invention is to provide improved concepts for error detection at the execution of program code instructions. The object of the present invention is solved by a system according to claim 1, by a method according to claim 14 and by a computer program according to claim 15.

A system comprising a first processor and a second processor is provided. The first processor is configured to load an instruction block from a first memory, wherein said instruction block comprises a plurality of opcodes and a stored error code. For each opcode of the plurality of opcodes of the instruction block, the first processor is configured to determine a first determined signature depending on said opcode. The first processor is configured to determine a determined error code for the instruction block depending on each opcode and depending on the first determined signature of each opcode of the plurality of opcodes of the instruction block. Moreover, the first processor is configured to determine that a first error occurred, if the determined error code is different from the stored error code. The second processor is configured to determine a second determined signature for a current opcode of the plurality of opcodes of the instruction block depending on said current opcode. Moreover, the second processor is configured to determine that a second error occurred, if the second determined signature for the current opcode is different from the first determined signature for the current opcode.

Moreover, a method is provided. The method comprises:

Loading an instruction block from a memory, wherein said instruction block comprises a plurality of opcodes and a stored error code.

For each opcode of the plurality of opcodes of the instruction block, determining a first determined signature depending on said opcode.

Determining a determined error code for the instruction block depending on each opcode and depending on the first determined signature of each opcode of the plurality of opcodes of the instruction block.

Determining that a first error occurred, if the determined error code is different from the stored error code.

Determining a second determined signature for a current opcode of the plurality of opcodes of the instruction block depending on said current opcode. And:

Determining that a second error occurred, if the second determined signature for the current opcode is different from the first determined signature for the current opcode.

Furthermore, a computer program for implementing the above-described method when being executed on a computer or signal processor is provided.

In the following, embodiments of the present invention are described in more detail with reference to the figures, in which:

BRIEF DESCRIPTION OF THE DRAWINGS

FIG. 1 illustrates a system according to an embodiment,

FIG. 2 illustrates a circuitry with four registers: three multiplexers, an adder and a multiplier, FIG. 5 illustrates the second processor of the system of FIG. 1 according to an embodiment, FIG. 6 illustrates the second processor of the system of FIG. 1 according to another embodiment, FIG. 9*a* illustrates an instruction cache representation according to an embodiment, FIG. 9*b* illustrates an non-volatile memory representation according to an embodiment, and FIG. 9*c* illustrates an instruction cache representation according to a further embodiment.

DETAILED DESCRIPTION OF EMBODIMENTS

Figure 3:
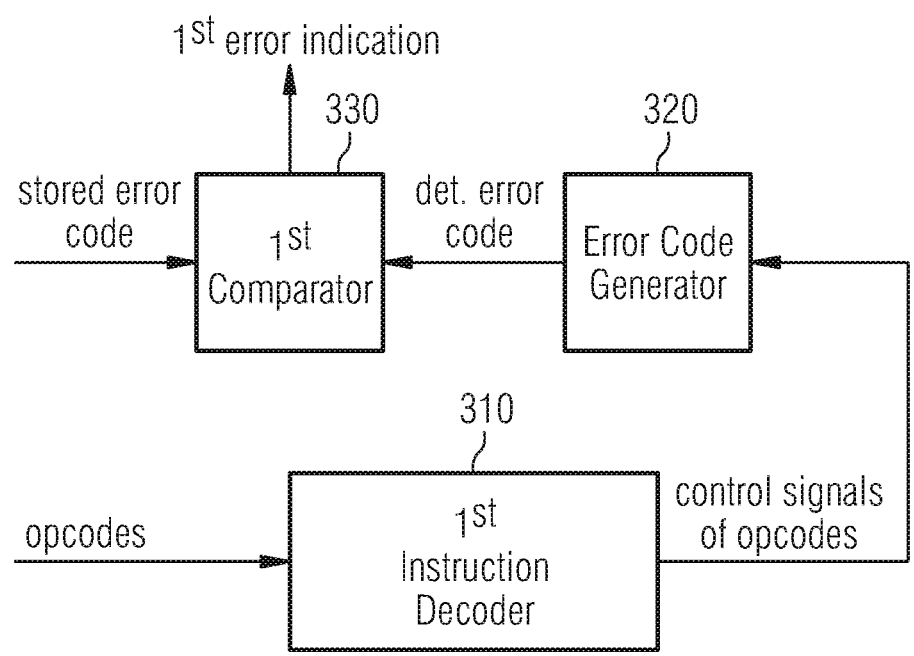
FIG. 3 illustrates the first processor of the system of FIG. 1 according to an embodiment.

FIG. 1 illustrates a system 100 comprising a first processor 110 and a second processor 120.

The first processor 110 is configured to load an instruction block from a first memory 105, wherein said instruction block comprises a plurality of opcodes and a stored error code.

For each opcode of the plurality of opcodes of the instruction block, the first processor 110 is configured to determine a first determined signature depending on said opcode. The first processor 110 is configured to determine a determined error code for the instruction block depending on each opcode and depending on the first determined signature of each opcode of the plurality of opcodes of the instruction block. Moreover, the first processor 110 is configured to determine that a first error occurred, if the determined error code is different from the stored error code.

The second processor 120 is configured to determine a second determined signature for a current opcode of the plurality of opcodes of the instruction block depending on said current opcode. Moreover, the second processor 120 is configured to determine that a second error occurred, if the second determined signature for the current opcode is different from the first determined signature for the current opcode.

In a particular embodiment, the second processor may, for example, be configured to execute the current opcode or a control signal depending on the current opcode, if the second determined signature for the current opcode is not different from the first determined signature for the current opcode.

In another particular embodiment, a wrong opcode may, for example, be executed, and afterwards, an alarm may, for example, be triggered.

Basically, an opcode may be transformed into a control signal to steer the computer or circuitry.

For example, a lot of gates may be available in a circuitry, As an example, FIG. 2 illustrates a circuitry with four registers: register a, register b, register c and register d, two multiplexers 210, 220, an adder 230 and a multiplier 240, and a further multiplexer 250.

To realize in a the pseudo assembler code "ADD register a, register c" (said pseudo assembler code may itself be encoded as an opcode, for example and hexadecimal represented opcode "b9", may encode such a pseudo assembler code) a lot of gates have to be respectively switched correctly.

E.g., in the simple example of FIG. 2, the control signal comprises, for example, 5 bits. In the example of FIG. 2, it is assumed that the register a is represented by "00", the register b is represented by "01", the register c is represented by "10", and the register d is represented by "11". Moreover, it is assumed that the adder 230 is represented by "0" and the multiplier 240 is represented by "1".

The first two bits of the control signal steer multiplexer 210. "00" indicates that the multiplexer selects the input from register a as its output, which is fed as first input into adder 230 and multiplier 240. The subsequent two bits steer the multiplexer 220. "10" indicates that the multiplexer selects the input from register c as its output, which is fed as second input into adder 230 and multiplier 240. The fifth bit steers the multiplexer 250. "0" indicates that the input from the adder 250 is the output of the multiplexer 250 and thus is the output of the circuitry of FIG. 2.

In another example, to realize the pseudo assembler code "MULT register a, register d", the corresponding control signal, would, for example, be "00111", wherein the first two bits steer the multiplexer 210 to select register a, wherein the subsequent two bits steer the multiplexer d to select register d and wherein the fifth bit steers the multiplexer 250 to select the input from the multiplier 240 as its output.

Control signals of more complex circuitries than that of FIG. 2, may, for example, use 16 bits, 32 bits, 64 bits or 96 bits to realize an opcode.

If commands of a program shall be protected by a signature, basically two ways exist. According to an embodiment, a signature for an opcode is calculated on the opcode itself. For example, if the opcode for the above pseudo assembler code "ADD register a, register c" would be "b7" (hexadecimal representation), then a signature would be calculated on the opcode itself, for example, on its binary representation "1011 0111". For example, the signature may, e.g., be a checksum. For example, by adding the bits of the binary representation and by considering only the last two bits, the checksum would result to "10".

According to another second embodiment, the opcode is transformed into the corresponding control signal and the signature is calculated on the control signal. As the control signal depends on the opcode, in this embodiment also, the signature also depends on the opcode, and can therefore also be regarded as a signature for the opcode.

For example, in the above embodiment of FIG. 2, the control signal would be "00100" and a correspondingly calculated checksum as signature would result in "01". It should be noted that in complex circuitries, the control signal, will in general be represented by much more bits than the opcode (in contrast to the example of FIG. 2, which was kept simple for explanatory purposes).

Thus, determining a signature for an opcode covers the case that a signature is calculated on the opcode, and moreover also covers the case that a control signal is derived from the opcode and that the signature for the opcode is calculated on said control signal derived from said opcode. Furthermore, determining a signature for an opcode also covers the case that a control signal depends on the opcode and that the signature for the opcode is calculated on said control signal which depends on said opcode.

In all these cases, because the signature directly or indirectly depends on the opcode, the signature is referred to as a signature for the opcode, even if the signature is calculated on the control signal which depends on the opcode.

The first processor 110 is configured to determine a determined error code for the instruction block depending on each opcode and depending on the first determined signature of each opcode of the plurality of opcodes of the instruction block. In a preferred embodiment, the first processor 110 is configured to determine the determined error code depending on, e.g., using, the first determined signature for each of the opcodes of the instruction block.

For example, if the first instruction block comprises eight opcodes, and if the first processor 110 determines that the signatures for the eight opcodes are 01, 11, 11, 01, 10, 00, 01, 11, then the error code may be calculated by adding the binary values of the checksums and by only considering the last three bits of the checksum. Thus, $$(0+1)+(1+1)+(1+1)+(0+1)+(0+0)+(0+1)+(1+1)=(1)$$
$$001=001$$

may be the determined error code in this example.

The determined error code is then compared with the (stored) error code of the instruction block stored in the memory 105. If the determined error code is different from the stored error code, the first processor assumes that a (first) error occurred. This first error may indicate that values in the memory have been modified (e.g., that they have been manipulated or unintentionally modified, e.g., because of memory failures), or that an error occurred when loading the values from the memory.

When the first error occurs, the processor may, e.g. terminate program execution, or, may, e.g., indicate the first error by an output interface (not shown) to a human operator, or may, e.g., indicate the first error to a further module that handles error treatment.

Such an error code allows a compact representation and few bits are required to store the stored error code in the memory 105.

In the above example, it should again be noted that the signature of an opcode may, e.g., be directly calculated on the opcode itself, or, e.g., the control signal of the opcode may be generated and the signature of the opcode may be calculated on the control signal of the opcode.

As outlined above, in FIG. 1, the second processor 120 is configured to determine the second determined signature for a current opcode of the plurality of opcodes of the instruction block depending on said current opcode. Moreover, the second processor 120 is configured to determine that a second error occurred, if the second determined signature for the current opcode is different from the first determined signature for the current opcode. The second processor may, for example, be configured to execute the current opcode or a control signal depending on the current opcode.

The above describes a situation wherein an opcode, the current opcode, (or the control signal of the current opcode) is about to be executed. The second processor 120 determines the signature for the current opcode (as a second determined signature) and compares it with the signature determined by the first processor 110 (the first determined signature of the current opcode). This may be conducted before, in parallel or after executing the current opcode or its control signal. This allows to check if whether in the meantime since loading the opcode from the first memory 105, the opcode or its control signal has been modified (e.g., by an attacker or unintentionally). As the signature has already been determined immediately after loading, a reference value, the first determined signature, exists for checking.

In a particular embodiment, only if both determined signatures are identical, the opcode or its control signal may, for example, really be executed. Or, in another particular embodiment, a wrong opcode may, e.g., be executed, and afterwards, an alarm may, for example, be triggered.

If both determined signatures are not identical that indicates that the second error occurred, e.g., an error, wherein in the meantime since loading the opcode from the first memory 105, the opcode or its control signal has been modified.

If the error code, determined by the first processor 110 is generated depending on the signatures of the first opcode, then this has the additional advantage that the determined signatures are also protected by the error code stored in the memory 105, and thus, the signatures determined by the first processor 110 and not only the opcodes can also be checked for correctness.

Moreover, if the first processor 110 uses the first signatures for generating the error code, then the further advantage of additional efficiency is provided, as the first determined signatures that have been generated for the later check against the second determined signatures can also be used for efficiently determining the determined error code by the first processor 110.

In a particular embodiment, a system is provided which comprises the above-described system 100 and further comprises the above-described first memory 105, wherein the above-described system 100 is configured to load an instruction block from the first memory 105.

According to an embodiment, for each opcode of the plurality of opcodes, the first processor 110 is configured to decode said opcode to obtain a control signal for said opcode, said control signal being one of a plurality of control signals, wherein the plurality of control signals comprises the control signal depending on the current opcode. For each opcode of the plurality of opcodes, the first processor 110 may, for example, be configured to determine the first determined signature of said opcode depending on the control signal of said opcode.

FIG. 3 illustrates a first processor 110 according to an embodiment. The first processor comprises a first instruction decoder 310, an error code generator 320 and a first comparator 330.

For each opcode of the plurality of opcodes, the first instruction decoder 310 is configured to decode said opcode to obtain the control signal for said opcode.

The error code generator 320 is configured to determine the determined error code for the instruction block using the control signal of each opcode of the plurality of opcodes of the instruction block.

The first comparator 330 is configured to determine that the first error occurred, if the determined error code is different from the stored error code.

In such an embodiment, the signature for the opcode is calculated on the control signal of the opcode. The control signal has been generated by the first instruction decoder.

If the signature for the opcode is generated on the control signal of the opcode, instead of generating it on the opcode itself, this has the additional advantage that the control signal of the opcode is also checked for correctness and not only the opcode itself.

In case, the first comparator detects that the determined error code and the stored error code are different from each other, it may, e.g., indicate the first error.

Figure 4:
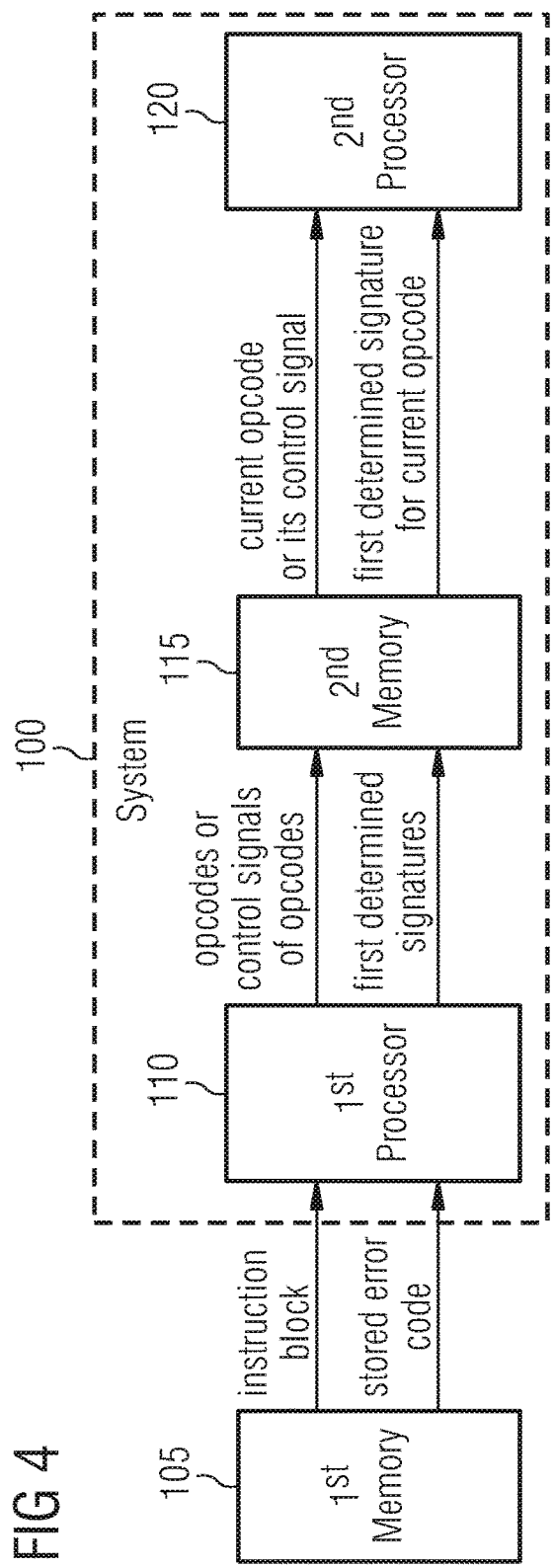
FIG. 4 illustrates a system according to a another embodiment, wherein the system comprises a second memory.

FIG. 4 illustrates an embodiment, wherein the system 100 comprises a second memory 115.

For each opcode of the plurality of opcodes of the instruction block, the first processor 110 is configured to store the said opcode or the control signal depending on said opcode into the second memory 115 and is configured to store the first determined signature for said opcode into the second memory 115.

The second processor 120 is configured to load the current opcode or the control signal depending on the current opcode from the second memory 115 and is configured to load the first determined signature for the current opcode from the second memory 115.

Storing the opcodes or the control signals of the opcodes of the instruction block in a second memory 115 has the advantage that the instruction block comprising a plurality of opcode (e.g., comprising 8 opcodes or e.g., 16 opcodes). Has to be loaded only once, but the opcodes of the instruction block or their control signals are available as a current opcode or as the control signal of the current opcode, when needed. Moreover, storing also the first determined signatures of the opcodes in the second memory 115 is also advantageous, as it allows to temporarily store the opcodes or their control signals in the second memory 115 and to also conduct the later comparison of the earlier determined first determined signature with the later determined second determined signature.

In a preferred embodiment, the second memory 115 may, e.g., be a cache. This allows fast access on the opcodes or their control signals and on the first determined signatures.

FIG. 5 illustrates the second processor 120 of a particular embodiment. In such an embodiment, for each opcode of the plurality of opcodes of the instruction block, the first processor is configured to store said opcode (and not the control signal of said opcode) into the second memory 115 (not shown in FIG. 5).

The second processor 120 of the embodiment of FIG. 5 comprises a second instruction decoder 510, a first signature determiner 520, a second comparator 530 and a first arithmetic logic unit 540;

The second instruction decoder 510 is configured to load the current opcode from the second memory 115 and to decode the current opcode to obtain the control signal of the current opcode.

The first signature determiner 520 is configured to determine the second determined signature for the current opcode using the control signal of the current opcode;

The second comparator 530 is configured to load the first determined signature for the current opcode from the second memory 115. Moreover, the second comparator 115 is configured to determine that the second error occurred, if the second determined signature for the current opcode is different from the first determined signature for the current opcode.

The first arithmetic unit 540 is configured to execute the control signal of the current opcode.

FIG. 6 illustrates the second processor 120 according to an alternative embodiment. For each opcode of the plurality of opcodes of the instruction block, the first processor is configured to store the control signal for said opcode (and not the opcode itself) into the second memory.

The second processor 120 of the embodiment of FIG. 6 comprises a first signature determiner 620, a second comparator 630 and a first arithmetic logic unit 640.

The first signature determiner 620 is configured to load the control signal of the current opcode from the second memory 115 (not shown in FIG. 6), and is configured to determine the second determined signature for the current opcode using the control signal of the current opcode.

The second comparator 630 is configured to load the first determined signature for the current opcode from the second memory 115. Moreover, the second comparator 630 is configured to determine that the second error occurred, if the second determined signature for the current opcode is different from the first determined signature for the current opcode; and The first arithmetic unit 640 is configured to execute the control signal of the current opcode.

Figure 7:
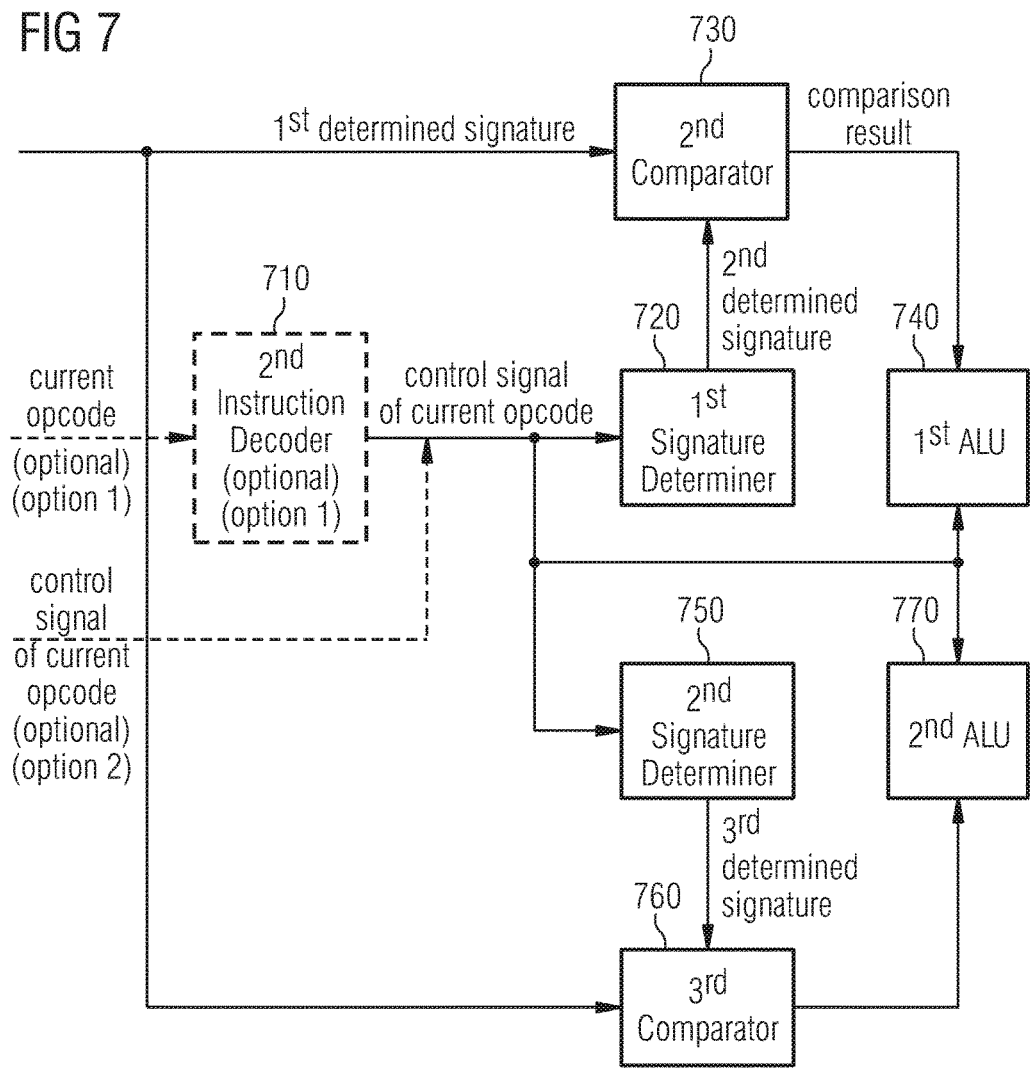
FIG. 7 illustrates the second processor of the system of FIG. 1 according to a further embodiment.

FIG. 7 illustrates a further embodiment, which enhances the embodiments of FIG. 5 and FIG. 6. In the embodiment of FIG. 7, the second processor 120 further comprises a second signature determiner 750, a third comparator 760 and a second arithmetic logic unit 770. The first signature determiner is denoted by reference sign 720, the second comparator is denoted by reference sign 730 and the first arithmetic logic unit 740.

The second instruction decoder, denoted by reference sign 710 is optional, and its presence depends on whether the embodiment of FIG. 5 is extended (in FIG. 7 denoted as option 1) or whether the embodiment of FIG. 6 is extended (in FIG. 7 denoted as option 2) by the further modules of FIG. 7.

In the embodiment of FIG. 7, the second signature determiner 750 is configured to determine a third determined signature for the current opcode using the control signal of the current opcode.

The third comparator 760 is configured to determine that a third error occurred, if the third determined signature for the current opcode is different from the first determined signature for the current opcode.

The second arithmetic unit 770 is configured to execute the control signal of the current opcode, if the third determined signature for the current opcode is not different from the first determined signature for the current opcode.

The embodiment of FIG. 7 provides further redundancy and thus further safety, as two ALUs, the first arithmetic logic unit 740 and the second arithmetic unit 770 execute the current opcode (or the control signal of the current opcode) independently from each other.

In an embodiment, an execution deviation detector (not shown) may, e.g., be configured to detect deviating results of the execution of the current opcode or of the execution of the control signal of the current opcode by the first arithmetic logic unit 740 and by the second arithmetic logic unit 770.

Figure 8:
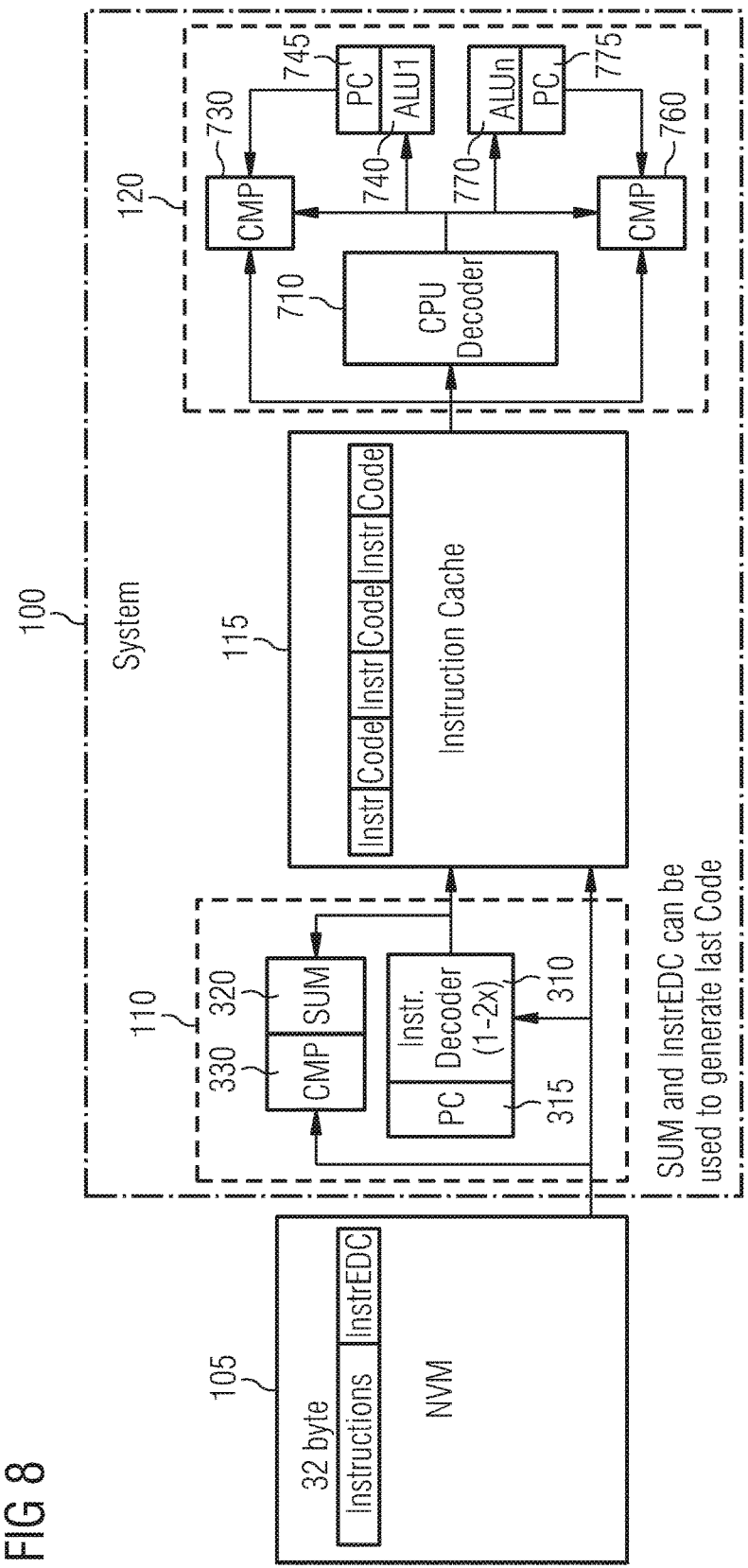
FIG. 8 illustrates a system according to a further embodiment, wherein the system comprises the second memory and wherein the second processor comprises two arithmetic logic units.

FIG. 8 illustrates a system 100 according to another embodiment comprising the first processor 110, the second memory 115 and the second processor 120. The system 100, in particular the first processor 110 interacts with the first memory 105.

In the embodiment of FIG. 8, the first processor comprises 110 the first instruction decoder 310, the error code generator 320 and the first comparator 320.

The second memory 115 is implemented as an instruction cache.

The second processor 120 comprises the second instruction decoder 710, the first signature determiner of FIG. 7 (not shown in FIG. 8), the second comparator 730, the second arithmetic logic unit 740, the second signature determiner of FIG. 7 (not shown in FIG. 8), the third comparator 760 and the third arithmetic logic unit 770.

FIG. 8 further illustrates a first program counter 315, a second program counter 745 and a third program counter 775.

According to an embodiment, for each opcode of the plurality of opcodes of the instruction block, the first processor 110 is configured to determine the first determined signature depending on said opcode and depending on a first value for said opcode of the first program counter 315 (e.g., of the instruction decoder 310). The first processor 110 is configured to determine a determined error code for the instruction block depending on each opcode of the plurality of opcodes of the instruction block and depending on the value of the first program counter 315 for each opcode of the plurality of opcodes of the instruction block.

The second processor 120 is configured to determine a second determined signature for a current opcode of the plurality of opcodes of the instruction block depending on said current opcode and depending on a second value for said opcode of the second program counter 745 (e.g., of the first arithmetic logic unit 740).

Also taking a value of a program counter into account for determining the signatures has the advantage that it is not only checked whether a valid opcode is executed, but that it is also checked, whether the valid opcode is executed at the right position in the program flow.

In FIG. 8, the second processor 120 is moreover configured to determine a third determined signature for a current opcode of the plurality of opcodes of the instruction block depending on said current opcode and depending on a third value for said opcode of the third program counter 775 (e.g., of the second arithmetic logic unit 770).

In the following particular embodiments and advantages of those embodiments are described.

According to some embodiments, the advantages of a signature solution are combined with the advantages of an error detecting code being part of the memory. A continuous error detecting mechanism is established which has minimal influence on the program to be protected and which has minimal memory overhead. The size of the protecting code is freely scalable.

In some embodiments, for each instruction/opcode a signature S(opcode) of freely selectable size is calculated. This signature depends on the opcode or a mapping of the opcode on, e.g., control signals for an ALU (arithmetic logic unit)/CPU (control processing unit). Moreover, further attributes of the opcode may be taken into account in the signature. This may, e.g., be the memory address of the opcode (program counter) or, e.g., a privilege which allows to execute the instruction. An error code C(InstrBlock) is now added to a block of instructions. Said error code has a freely selectable size, and results from a mapping function of the signatures S(Opcode) of the opcodes being stored in the memory. Said instruction block with said error code C(InstrBlock) can then be stored in a program memory. The generation of the error code C(InstrBlock) may, for example, be conducted online on the hardware. However, the generation of the error code may, for example, alternatively or additionally by conducted offline using a toolchain.

When executing a program protected as described above, for each opcode of each program block which is to be executed, the signature S(Opcode) is calculated for said opcode, and an error code C(InstrBlock) is calculated from the signatures. Said error code can then be compared with a stored error code. By this, the correctness of the transformation of the error code of an instruction block into opcode-specific signatures can be ensured. The instructions comprising the signatures are then provided to the CPU for being executed. Using the extended attributes in the signature, it is also possible to check, whether the instruction has been loaded from the correct memory address (program counter). By this, an efficient program execution control is realized. If the instruction sequence is only allowed in a particular software level, then it is also possible to check this.

If the system allows that a check for possible errors is conducted only after a certain number of instructions have been executed, then instructions, for which the signatures have been generated, may already have been executed before the check using the error code C(InstrBlock) has been conducted.

If the signature is inter alia calculated from the control signals, being generated for the opcode, which has to be fed into an ALU for executing the respective instruction, an effective protection of the whole opcode generation becomes possible by this. By calculating C(InstrBlock) based on the signatures, a protection mechanism for generating the online signature is not necessary. Only the comparisons of the error codes being generated online with the reference values from the memory.

According to a possible implementation of an embodiment, a cache or buffer is implemented for further optimization between the program memory, in which opcodes are block-wise protected by an error code C(InstrBlock) and the CPU, which works on opcodes being protected by signatures S(Opcode). To this end, the cache is filled with instructions and with the associated signatures S(Opcode). When filling the cache or buffer, the above-described generation and check of the signatures against the error code of the program counter takes place. This optimizes in particular the execution of program loops. Moreover, the disadvantage is overcome that for executing a single instruction the whole instruction block has to be decoded with respect to the signatures.

Returning to FIG. 8 there, instruction signature compression according to an embodiment is depicted.

Each instruction is protected by an instruction code (InstrCode) which reflects the control signals to be generated for CPU execution and the PC of their storage location.

In the first memory 105, e.g., non-volatile memory (NVM), per storage block the instruction code are hashed to an instruction error detection code EDC (InstrEDC) which is stored together with the data portion.

When reading a non-volatile memory block, the instruction codes are generated and stored into the second memory 115, e.g., a cache. In an embodiment, the instruction codes are hashed and compared against the delivered instruction error detection code.

On execution, the generated control signals and the program counter (PC) are hashed to the instruction code and are compared against the given one. Together with a redundant program counter generation (one for fetch, one for hashing). By this, a protection of the instruction flow is further improved.

In an alternative embodiment, instead of storing the instructions in the cache 115, the decoded control signals are stored in the cache 115. By this, second instruction decoder 710, e.g., a CPU decoder, becomes obsolete.

In a further alternative embodiment, only one CheckWord per cache word is employed. In this in case, for branches to an "not word aligned" address, a 16 bit predecessor instruction has also to be hashed. There is a roughly 25% chance that this happens.

When an opcode set with opcodes of different size is used (for example, 16 bits and 32 bits) the problem arises that an instruction block does not necessarily start with the beginning of an instruction. It is possible that the block starts with the second half of a 32 bit instruction (half word (16 bit) orientation assumed). The same problem arises for the end of an instruction block. There also, only half of a 32 bit instruction may be located in the instruction block. For calculating the error code C, either the unavailable instruction half is additionally be loaded, or the whole instruction including its signature is not considered.

A strategy that corresponds to a normal forward-oriented program flow is, to not take the incomplete opcode at the beginning of an instruction block into account in the error code C(InstrBlock) of said instruction block, and to take into account the incomplete opcode at the end of an instruction block in addition with the unavailable half from the linearly succeeding instruction block and its signature. This strategy is based on the assumption that a linearly proceeding program needs the succeeding instruction block, as well. If the employed instruction set does not exhibit this property that from an arbitrary instruction set the start of the opcode can always be determined, then a marker may be stored in the program memory in addition to the error code C(InstrBlock), which defines whether the first complete instruction of the instruction block starts with the first or the second half word.

Figure 9A:
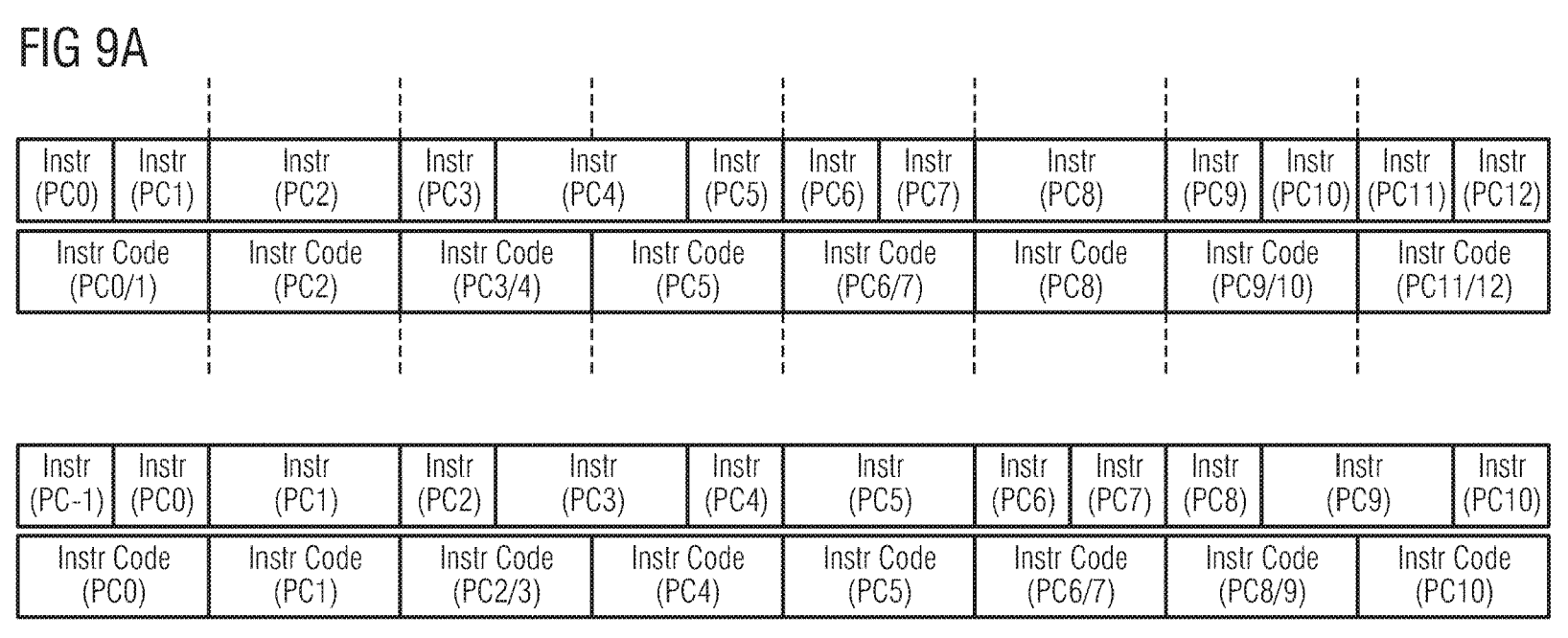

FIG. 9a illustrates an (instruction) cache representation according to an embodiment. A marker may, e.g., be employed which indicates whether the first half word of a word is 16 bit instruction. FIG. 9a illustrates a situation, wherein the last element of the upper instruction block and the first element of the lower instruction block is a partial opcode.

According to an embodiment, the first processor 110 is configured to determine, if the instruction block comprises a partial opcode, wherein said partial opcode is incomplete. If the partial opcode is located at an end of the instruction block, the first processor 110 is configured to load a first further instruction block (e.g., a subsequent instruction block, immediately succeeding the current instruction block) to obtain a missing portion, missing in the partial opcode, and to determine the error code depending on the partial opcode and depending on the missing portion. If the partial opcode is located at a start of the instruction block, the first processor 110 is configured to determine the error code not depending on the partial opcode.

In FIG. 9b, an non-volatile memory representation according to such an embodiment is depicted. The lower instruction block is loaded to obtain the missing portion missing in the partial opcode of the upper instruction block. Alternatively, for example only the first instruction word from the lower instruction block is loaded and read. The error code for the upper instruction block is determined depending on all opcodes of the upper instruction block, depending on the partial opcode at the end of the upper instruction block, and depending on the partial opcode at the start of the lower instruction block.

According to an alternative embodiment, the first processor 110 is configured to determine, if the instruction block comprises a partial opcode, wherein said partial opcode is incomplete. If the partial opcode is located at the start of the instruction block, the first processor 110 is configured to load a second further instruction block (e.g., a preceding instruction block, immediately preceding the current instruction block) to obtain a missing portion, and to determine the error code depending on the partial opcode and depending on the missing portion. If the partial opcode is located at the end of the instruction block, the first processor 110 is configured to determine the error code not depending on the partial opcode.

FIG. 9c illustrates an (instruction) cache representation according to a further embodiment.

Although some aspects have been described in the context of a system, it is clear that these aspects also represent a description of the corresponding method, where a block or device corresponds to a method step or a feature of a method step. Analogously, aspects described in the context of a method step also represent a description of a corresponding block or item or feature of a corresponding system.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A system, comprising:
    a first processor configured to:
        load from a first memory an instruction block comprising a plurality of opcodes and a stored error code;
        for each opcode of the plurality of opcodes of the instruction block, determine a first determined signature depending on said opcode;
        determine, for the instruction block, a determined error code which depends on each opcode and on the first determined signature of each opcode of the plurality of opcodes of the instruction block; and
        determine that a first error occurred, if the determined error code is different from the stored error code; and
    a second processor configured to:
        determine a second determined signature for a current opcode of the plurality of opcodes of the instruction block depending on said current opcode; and
        determine that a second error occurred, if the second determined signature for the current opcode is different from the first determined signature for the current opcode.

2. A system according to claim 1, wherein the second processor is configured to execute the current opcode or a control signal depending on the current opcode, if the second determined signature for the current opcode is not different from the first determined signature for the current opcode.

3. A system according to claim 1, wherein, for each opcode of the plurality of opcodes, the first processor is configured to:
    decode said opcode to obtain a control signal for said opcode, the respective control signal being one of a plurality of control signals; and
    determine the first determined signature of said opcode depending on the control signal of said opcode.

4. A system according to claim 3, wherein the first processor comprises:
  a first instruction decoder, wherein, for each opcode of the plurality of opcodes, the first instruction decoder is configured to decode said opcode to obtain the control signal for said opcode;
  an error code generator configured to determine the determined error code for the instruction block using the control signal of each opcode of the plurality of opcodes of the instruction block; and
  a first comparator configured to determine that the first error occurred, if the determined error code is different from the stored error code.

5. A system according to claim 3, further comprising:
  a second memory,
  wherein, for each opcode of the plurality of opcodes of the instruction block, the first processor is configured to store said opcode or the control signal depending on said opcode, and the first determined signature for said opcode, into the second memory, and
  wherein the second processor is configured to load the current opcode or the control signal depending on the current opcode, and the first determined signature for the current opcode, from the second memory.

6. A system according to claim 5, wherein the second memory is a cache.

7. A system according to claim 5, wherein:
  for each opcode of the plurality of opcodes of the instruction block, the first processor is configured to store said opcode into the second memory, and
  the second processor comprises:
    a second instruction decoder configured to load the current opcode from the second memory, and decode the current opcode to obtain the control signal of the current opcode;
    a first signature determiner configured to determine the second determined signature for the current opcode using the control signal of the current opcode;
    a second comparator configured to:
      load the first determined signature for the current opcode from the second memory; and
      determine that the second error occurred, if the second determined signature for the current opcode is different from the first determined signature for the current opcode; and
    a first arithmetic logic.

8. A system according to claim 7, wherein the second processor further comprises:
  a second signature determiner configured to determine a third determined signature for the current opcode using the control signal of the current opcode;
  a third comparator configured to determine that a third error occurred, if the third determined signature for the current opcode is different from the first determined signature for the current opcode; and
  a second arithmetic logic is configured to execute the control signal of the current opcode, if the third determined signature for the current opcode is not different from the first determined signature for the current opcode.

9. A system according to claim 8, further comprising:
  an execution deviation detector configured to detect deviating results of the execution of the current opcode or of the execution of the control signal of the current opcode by the first arithmetic logic and by the second arithmetic logic.

10. A system according to claim 5, wherein:
  for each opcode of the plurality of opcodes of the instruction block, the first processor is configured to store the control signal for said opcode into the second memory;
  the second processor comprises:
    a first signature determiner configured to load the control signal of the current opcode from the second memory, and determine the second determined signature for the current opcode using the control signal of the current opcode;
    a second comparator configured to:
      load the first determined signature for the current opcode from the second memory; and
      determine that the second error occurred, if the second determined signature for the current opcode is different from the first determined signature for the current opcode; and
    a first arithmetic logic.

11. A system according to claim 1,
  wherein the first processor is configured to:
    for each opcode of the plurality of opcodes of the instruction block, determine the first determined signature depending on said opcode and depending on a first value for said opcode of a first program counter; and
    determine a determined error code for the instruction block depending on each opcode of the plurality of opcodes of the instruction block and depending on the value of the first program counter for each opcode of the plurality of opcodes of the instruction block; and
  wherein the second processor is configured to determine a second determined signature for a current opcode of the plurality of opcodes of the instruction block depending on said current opcode and depending on a second value for said opcode of a second program counter.

12. A system according to claim 1,
  wherein the first processor is configured to determine, if the instruction block comprises a partial opcode, wherein said partial opcode is incomplete;
  wherein, if the partial opcode is located at an end of the instruction block, the first processor is configured to load at least a first word of a first further instruction block to obtain a missing portion, missing in the partial opcode, and to determine the error code depending on the partial opcode and depending on the missing portion; and wherein, if the partial opcode is located at a start of the instruction block, the first processor is configured to determine the error code not depending on the partial opcode; or
  wherein, if the partial opcode is located at the start of the instruction block, the first processor is configured to load at least a last word of a second further instruction block to obtain the missing portion, missing in the partial opcode, and to determine the error code depending on the partial opcode and the missing portion; and wherein, if the partial opcode is located at the end of the instruction block, the first processor is configured to determine the error code not depending on the partial opcode.

13. A system according to claim 1, further comprising:
  a first memory,
  wherein the first processor is configured to load an instruction block from the first memory.

14. A system according to claim 1, further comprising:
a second memory,
wherein, for each opcode of the plurality of opcodes of the instruction block, the first processor is configured to store said opcode and the first determined signature for said opcode into the second memory, and
wherein the second processor is configured to load the current opcode and the first determined signature for the current opcode from the second memory.

15. A method, comprising:
loading, by a first processor, an instruction block from a first memory, wherein said instruction block comprises a plurality of opcodes and a stored error code;
for each opcode of the plurality of opcodes of the instruction block, the first processor determining a first determined signature depending on said opcode;
determining, by the first processor for the instruction block, a determined error code which depends on each opcode and on the first determined signature of each opcode of the plurality of opcodes of the instruction block;
determining, by the first processor, that a first error occurred, if the determined error code is different from the stored error code;
determining, by a second processor, a second determined signature for a current opcode of the plurality of opcodes of the instruction block depending on said current opcode; and
determining, by the second processor, that a second error occurred, if the second determined signature for the current opcode is different from the first determined signature for the current opcode.

16. The method of claim 15, further comprising:
for each opcode of the plurality of opcodes of the instruction block, the first processor storing said opcode and the first determined signature for said opcode into a second memory; and
loading, by the second processor, the current opcode and the first determined signature for the current opcode from the second memory.

17. The method of claim 15, further comprising:
for each opcode of the plurality of opcodes, the first processor decoding said opcode to obtain a control signal for said opcode, the respective control signal being one of a plurality of control signals, and determining the first determined signature of said opcode depending on the control signal of said opcode;
for each opcode of the plurality of opcodes of the instruction block, the first processor storing said opcode or the control signal depending on said opcode, and the first determined signature for said opcode, into the second memory; and
loading, by the second processor, the current opcode or the control signal depending on the current opcode, and the first determined signature for the current opcode, from the second memory.

* * * * *